United States Patent

Wang et al.

[11] Patent Number: 5,939,006
[45] Date of Patent: Aug. 17, 1999

[54] METHOD FOR FORMING A COMPOSITE AIRFOIL STRUCTURE

[75] Inventors: Hsin-Pang Wang, Rexford; Martin Kinfei Lee, Niskayuna, both of N.Y.

[73] Assignee: General Electric Company, Schenectady, N.Y.

[21] Appl. No.: 08/908,467

[22] Filed: Aug. 6, 1997

Related U.S. Application Data

[63] Continuation of application No. 08/496,916, Jun. 28, 1995, abandoned.

[51] Int. Cl.$^6$ ..................................................... B29C 43/20
[52] U.S. Cl. .......................................... 264/258; 264/257
[58] Field of Search .................................... 264/257, 266, 264/258

[56] References Cited

U.S. PATENT DOCUMENTS

| | | | |
|---|---|---|---|
| 2,202,014 | 5/1940 | Lougheed | 264/258 |
| 3,138,506 | 6/1964 | Ross | 156/285 |
| 3,873,654 | 3/1975 | Smith | 264/258 |
| 4,031,601 | 6/1977 | Staub et al. | 264/258 |
| 4,471,020 | 9/1984 | McCarthy | 264/257 |
| 4,639,284 | 1/1987 | Mouille et al. | 264/258 |
| 4,759,893 | 7/1988 | Krauter | 264/258 |
| 5,041,182 | 8/1991 | Sekiguchi et al. | 264/255 |
| 5,547,629 | 8/1996 | Diesen et al. | 264/257 |

*Primary Examiner*—Jan. H. Silbaugh
*Assistant Examiner*—Robin S. Gray
*Attorney, Agent, or Firm*—David C. Goldman; Marvin Snyder

[57] ABSTRACT

A method and a system for forming a composite airfoil structure from a preform composite airfoil structure made from resin impregnated prepreg plies. The preform is shaped with a mold having a stationary lower mold and an upper mold. The preform is inserted in the lower mold and the upper mold is then moved towards the lower mold. The preform is compressed with the upper and lower mold, providing a contact between the upper mold, the preform, and the lower mold. Extra resin from the preform is removed through the leading edge and trailing edge. During the compression molding process, the shear stress on the plies of the preform is balanced, hence eliminating ply movement and preventing wrinkles from occurring. In addition, the length of the resin flow path is reduced, which decreases the mold force requirement, shear stresses, and thus wrinkles.

7 Claims, 8 Drawing Sheets fig. 1 fig. 2

METHOD FOR FORMING A COMPOSITE AIRFOIL STRUCTURE

This application is a Continuation of application Ser. No. 08/496,916, filed Jun. 28, 1995, now abandoned.

BACKGROUND OF THE INVENTION

The present invention relates generally to a composite airfoil structure for aircraft engines and more particularly to a method and system for forming a composite airfoil structure without incurring wrinkles and porosity defects.

Presently, a composite airfoil structure (i.e., a fan blade) can be formed by placing a resin impregnated preform of the blade in a mold having a stationary lower mold piece and a vertically moving upper mold piece. As the upper mold piece closes towards the lower mold piece, the mold forms a cavity with all fours sides of the preform (e.g. root, tip, leading edge and trailing edge sides) closed. In this approach, the mold first contacts the root section of the preform and moves towards the tip section of the preform last. The moving contact and the closed mold cause the resin to flow mainly in the blade in a lengthwise direction. Since the resin flows in the lengthwise direction, it will exert a shear stress on the plies of the preform. When the shear stress overcomes the interfacial friction between adjacent ply layers, the plies will move in the direction of the net resultant shear force, causing the plies to wrinkle. In addition, the mold force, the heat transfer, and the chemical reaction of the compression molding process is unsymmetrical and difficult to predict and control because of the progressively changing contact between the mold and the preform. The unpredictability often results in porosity defects.

To overcome the disadvantages associated with the moving contact of the compression molding process, a fan blade can be formed with a bag molding process, a constant pressure process, which uses one stationary mold surface and a flexible upper inflatable bag surface. Although the bag molding process does provide constant contact, it cannot provide the same amount of force and heat, or the same quality of dimension, surface or mechanical properties associated with the moving contact of the constant displacement compression molding process. Thus, there is a need for a method and a system for forming a blade that provides full constant contact between the mold and the preform as with the bag molding process and that provides the same amount of force and heat as with the moving contact of the compression molding process.

SUMMARY OF THE INVENTION

Therefore, it is a primary objective of the present invention to provide a method and a system for forming an airfoil structure that results in good dimension, surface finish and mechanical properties, without incurring wrinkles or porosity defects.

Thus, in accordance with the present invention, there is provided a method and a system for forming a composite airfoil structure from a preform of resin impregnated prepreg plies. The composite airfoil structure has a root section at one end and a tip section at a second end opposite therefrom. Extending from the root section to the tip section are a leading edge and a trailing edge. The preform is shaped with a mold having a lower mold and an upper mold. In the first embodiment, the preform is inserted in the lower mold and the upper mold is then moved towards the lower mold. The preform is compressed with the upper and lower mold, providing contact between the upper mold, the preform, and the lower mold. The contact balances resin flow through the preform, pressure, and shear stresses developing in the preform. Extra resin from the preform is removed through the leading edge and trailing edge to form the composite airfoil structure.

In accordance with a second embodiment, there is provided a method and a system for forming a composite airfoil structure from a preform of resin impregnated prepreg plies. The composite airfoil structure has a root section at one end and a tip section at a second end opposite therefrom. Extending from the root section to the tip section are a leading edge and a trailing edge. The preform is shaped with a mold having a lower mold and an upper mold. In the second embodiment, the preform is inserted in the lower mold and the upper mold is then moved towards the lower mold. The preform is compressed with the upper and lower mold, providing full contact between the upper mold, the preform, and the lower mold, wherein resin flows in a symmetric line between the root section and tip section of the preform. The full contact balances resin flow through the preform, pressure, and shear stresses developing in the preform. Extra resin from the preform is removed through the leading edge and trailing edge to form the composite airfoil structure.

In accordance with a third embodiment, there is provided a method and a system for forming a composite airfoil structure from a first and second preform made of resin impregnated prepreg plies. The composite airfoil structure has a root section at one end and a tip section at a second end opposite therefrom. Extending from the root section to the tip section of each preform are a leading edge and a trailing edge. The first and second preforms are shaped with a mold having a lower mold and an upper mold. In the third embodiment, the first and second preforms are attached together, wherein the root sections of each preform are aligned and joined together. The first and second preforms are then inserted in the lower mold and the upper mold is then moved towards the lower mold. The first and second preforms are compressed with the upper and lower mold, providing a moving contact between the upper mold, the first and second preforms, and the lower mold. As a result, resin flows in a symmetric line from the root section to the tip section of both the first and second preforms to form the composite airfoil structure.

In accordance with a fourth embodiment, there is provided a method and a system for forming a composite airfoil structure from a first and second preform made of resin impregnated prepreg plies. The composite airfoil structure has a root section at one end and a tip section at a second end opposite therefrom. Extending from the root section to the tip section in each preform are a leading edge and a trailing edge. The first and second preforms are shaped with a mold having a lower mold and an upper mold. In the fourth embodiment, the first and second preforms are attached together, wherein the root sections of each preform are aligned and joined together. The first and second preforms are then inserted in the lower mold and the upper mold is then moved towards the lower mold. The first and second preforms are compressed with the upper and lower mold, providing full contact between the upper mold, the first and second preforms, and the lower mold. The resin in both the first and second preforms flows in a symmetric line from the root section to the tip section. The full contact balances resin flow through the preforms, pressure, and shear stresses developing in the preforms. Extra resin is removed from the first and second preforms through the leading edge and trailing edge to form the composite airfoil structure.

While the present invention will hereinafter be described in connection with an illustrative embodiment and method of use, it will be understood that it is not intended to limit the invention to this embodiment. Instead, it is intended to cover all alternatives, modifications and equivalents as may be included within the spirit and scope of the present invention as defined by the appended claims.

DETAILED DESCRIPTION OF THE PRESENT INVENTION

Figure 1:
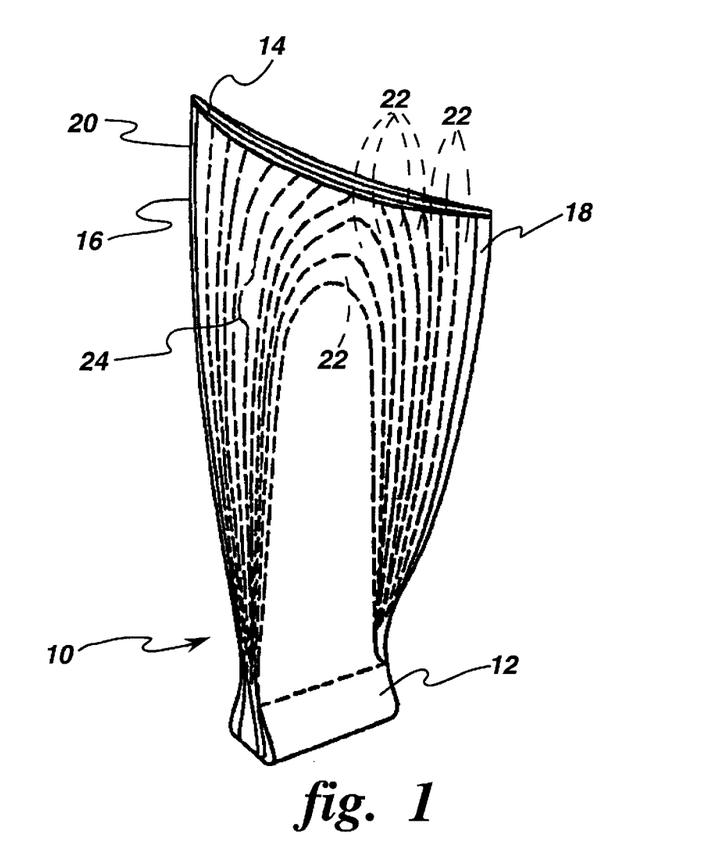
FIG. 1 is an illustration of a composite fan blade.

FIG. 1 is an illustration of a composite fan blade 10. The fan blade 10 includes a root section 12 at one end and a tip section 14 at a second end opposite therefrom. Extending along the blade 10 from the root section 12 to the tip section 14 are a leading edge 16 and a trailing edge 18. The fan blade 10 is made from a preform 20 which forms the core of the blade. The preform 20 is layered with laminated prepreg skins 22 (e.g., resin impregnated layers) that provide the airfoil shape and add structural stiffness. A more detailed description of the composite fan blade is provided in U.S. Pat. No. 5,279,892, which is incorporated herein by reference. As stated earlier, a problem with compression molding a fan blade is that it often causes the plies of the prepreg layers in the fan blade to wrinkle 24. Ply wrinkling occurs when a compressive force, which causes pressure and shear on the plies of prepreg layers, exceeds the binder strength. The mechanical properties of a fan blade will be compromised by ply wrinkling, because it makes the blade more susceptible to tensile and bending forces.

Figure 2:
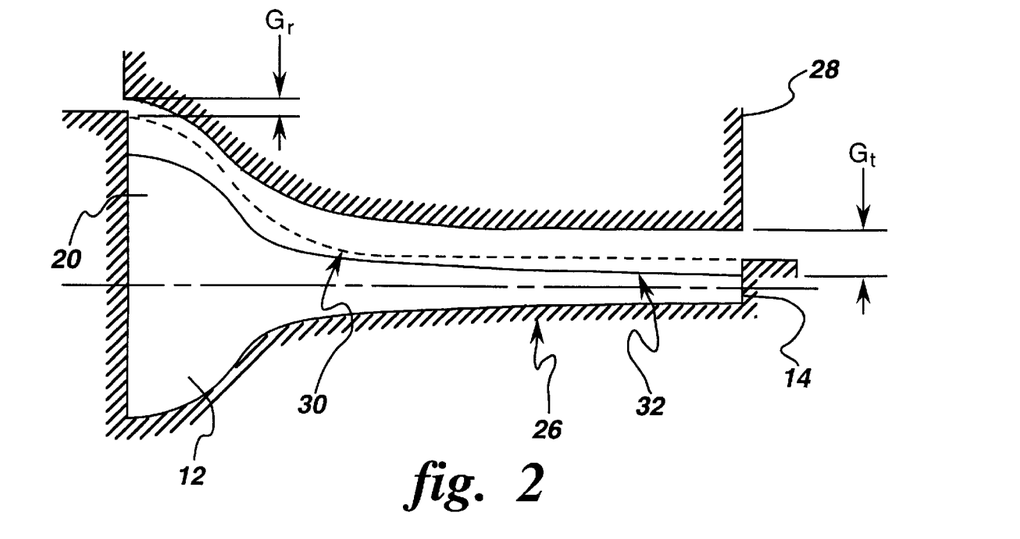
FIG. 2 is a cross sectional view of the composite fan blade in a compression mold.

FIG. 2 is a cross sectional view of the composite fan blade 10 in a compression mold. The compression mold includes a stationary lower mold 26 where the preform 20 with the plies of resin impregnated layers are nested and an upper mold 28. A cavity is formed as the upper mold is moved towards the lower mold. The cavity is equal to the final shape of the molded fan blade. The shape of the preform 20 prior to compression molding is bigger than the final shape of the fan blade in order to account for consolidation and the elimination of dissolved gas. Generally, the preform 20 has an extra thickness that is usually 2% to 3% of the fan blade's final thickness. The top surface of the preform 20 prior to compression molding is shown in FIG. 2 with a dotted line and is designated by reference numeral 30. In addition, the preform 20 has a root section 12 that is thicker than the tip section 14.

Figure 3A:
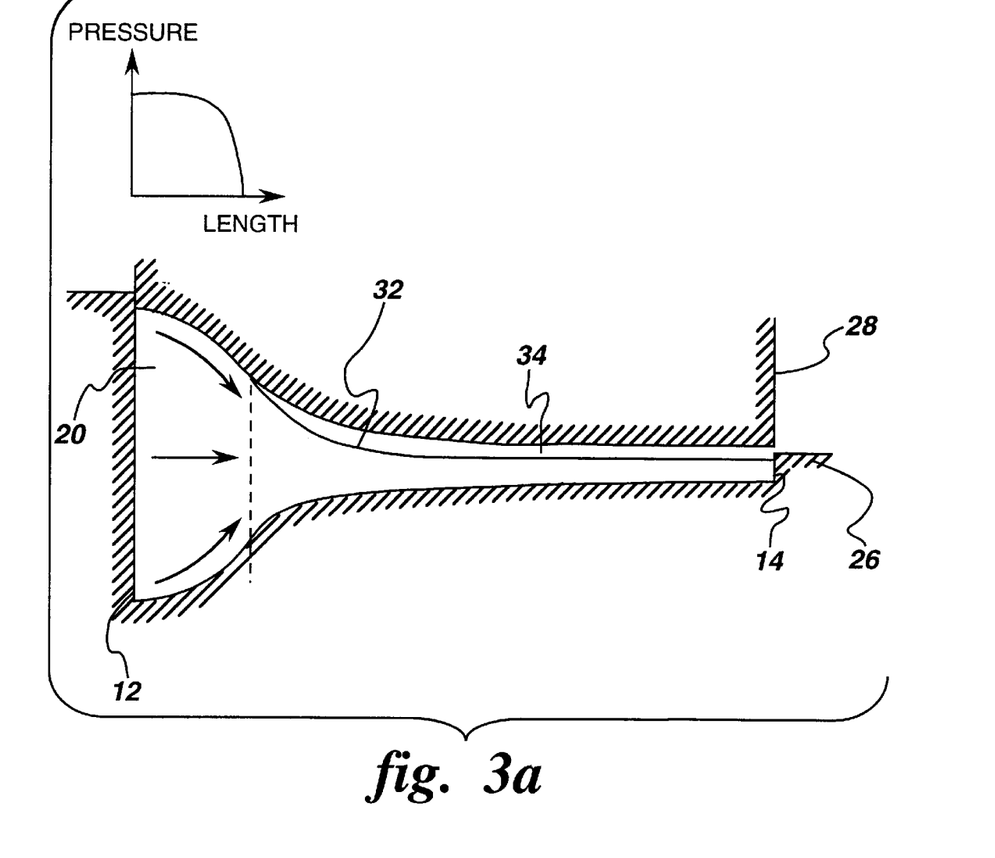
FIGS. 3a–3b are a cross sectional view and a top view, respectively, of the composite fan blade during a compression molding process.
Figure 3B:
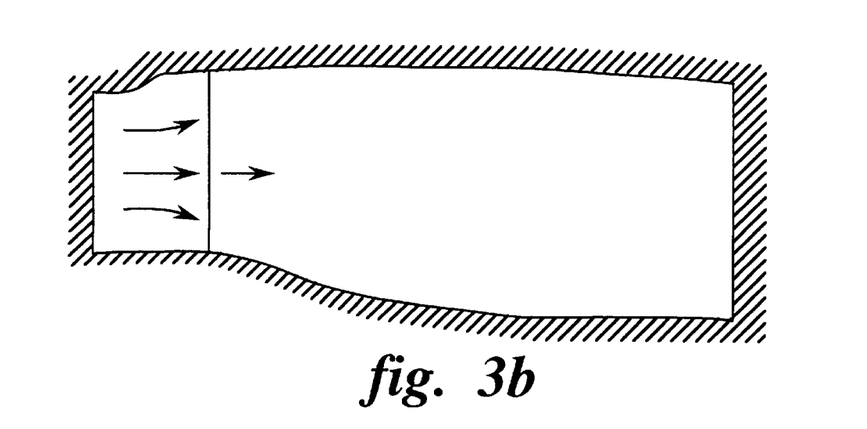

During the compression molding process, the upper mold moves down and compresses the top surface 30 of the preform 20 and the plies of resin impregnated layers to a final surface 32 of the preform such that the root section 12 is compressed first and the tip section 14 last. The root section 12 of the preform 20 is compressed before the tip section 14 because the gap between the upper mold 28 and the top surface 30 of the preform at the root ($G_r$) is less than the gap between the upper mold and the top surface 30 of the preform at the tip ($G_t$). FIGS. 3a–3b show a cross sectional view and a top view, respectively, of the composite fan blade during the compression molding process, as the upper mold 28 compression molds the preform 20 and the plies of resin impregnated layers. As the upper mold 28 moves along the preform 20 from the root section 12 to the tip section 14, the resin from the plies of the impregnated layers flows in that same direction as shown by the arrows in FIGS. 3a–3b. In addition to the resin flow, pressure, and shear stresses develop at the root section 12 and move to the tip section 14 in the same direction as the resin flow. The direction of the resin flow and the shear stresses is lengthwise from the root section to the tip section because the pressure gradient at the beginning of the molding process is greatest at the root section and subsides as the moving contact moves to the tip section. The pressure gradient subsides as the moving contact moves to the tip section 14 because of a gap of air 34 that is formed between the upper mold 28 and the preform 20. Since the resin flow and the shear stress direction is not balanced throughout the blade, the plies of resin impregnated layers will move and hence form a wrinkle 24.

Figure 4:
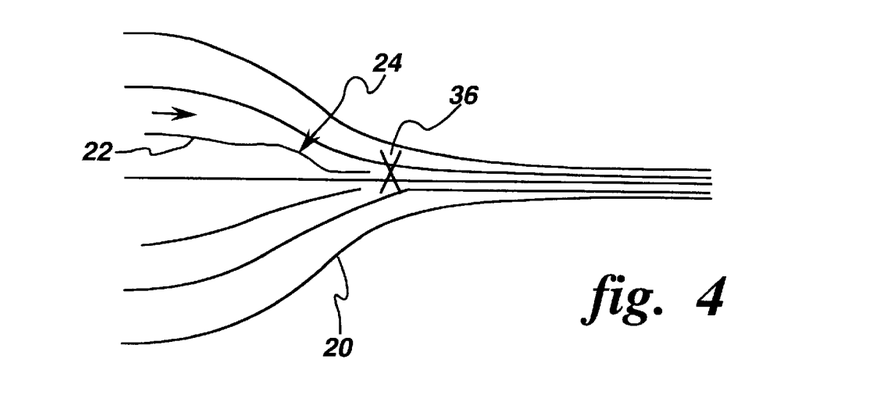
FIG. 4 is a cross sectional view of the composite fan blade showing a ply wrinkle.

A more detailed view of the wrinkle 24 is shown in the cross-sectional view of FIG. 4. The cause of the wrinkle can be simplified as follows. As the upper mold 28 closes and compresses the preform 20, resin pressure is created within the preform. The pressure gradient creates resin flow which will exert a shear stress on the plies. When the shear stress overcomes the interfacial friction or the binder strength between adjacent ply layers, the plies will move in the direction of net resultant ply shear force. The interfacial friction between the ply layers is a function of the fiber stress normal to the ply layer. The integration of the fiber stress plus the resin pressure distribution equals the total mold force. If such movement is stopped by a physical constraint 36 and the shear force is strong enough, a wrinkle 24 can occur.

Figure 5A:
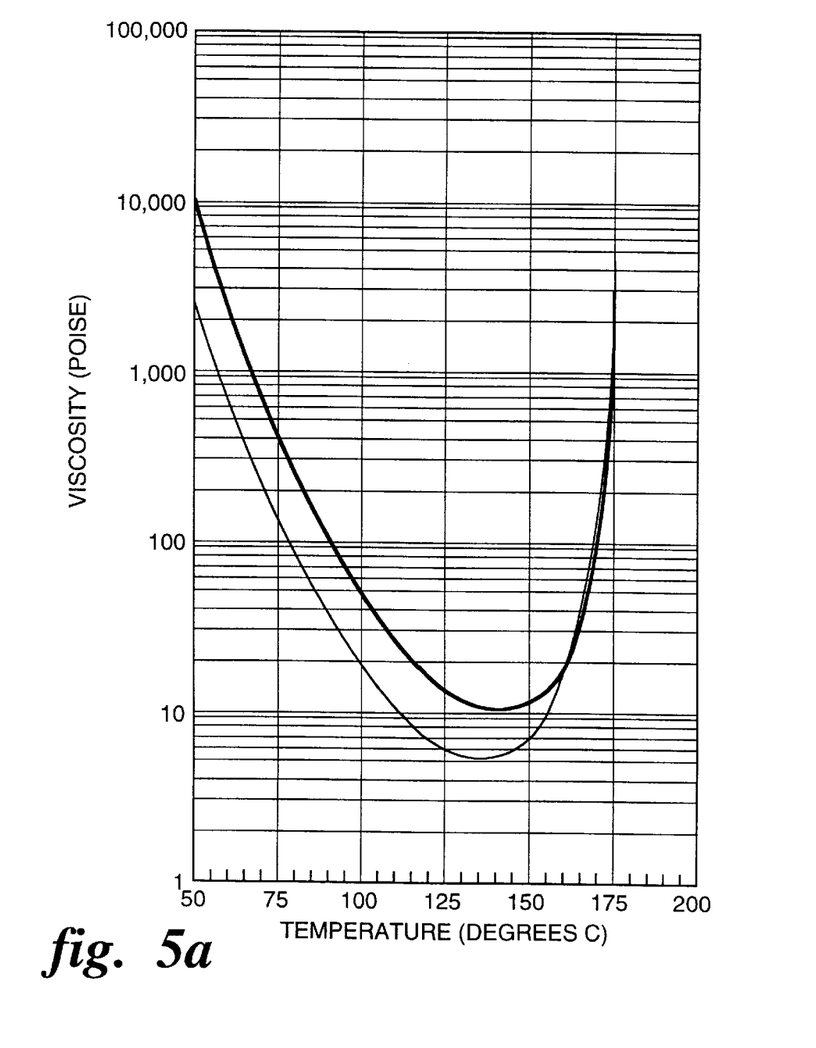
FIGS. 5a–5b are a viscosity-temperature curve and a mold gap-molding time curve, respectively.
Figure 5B:
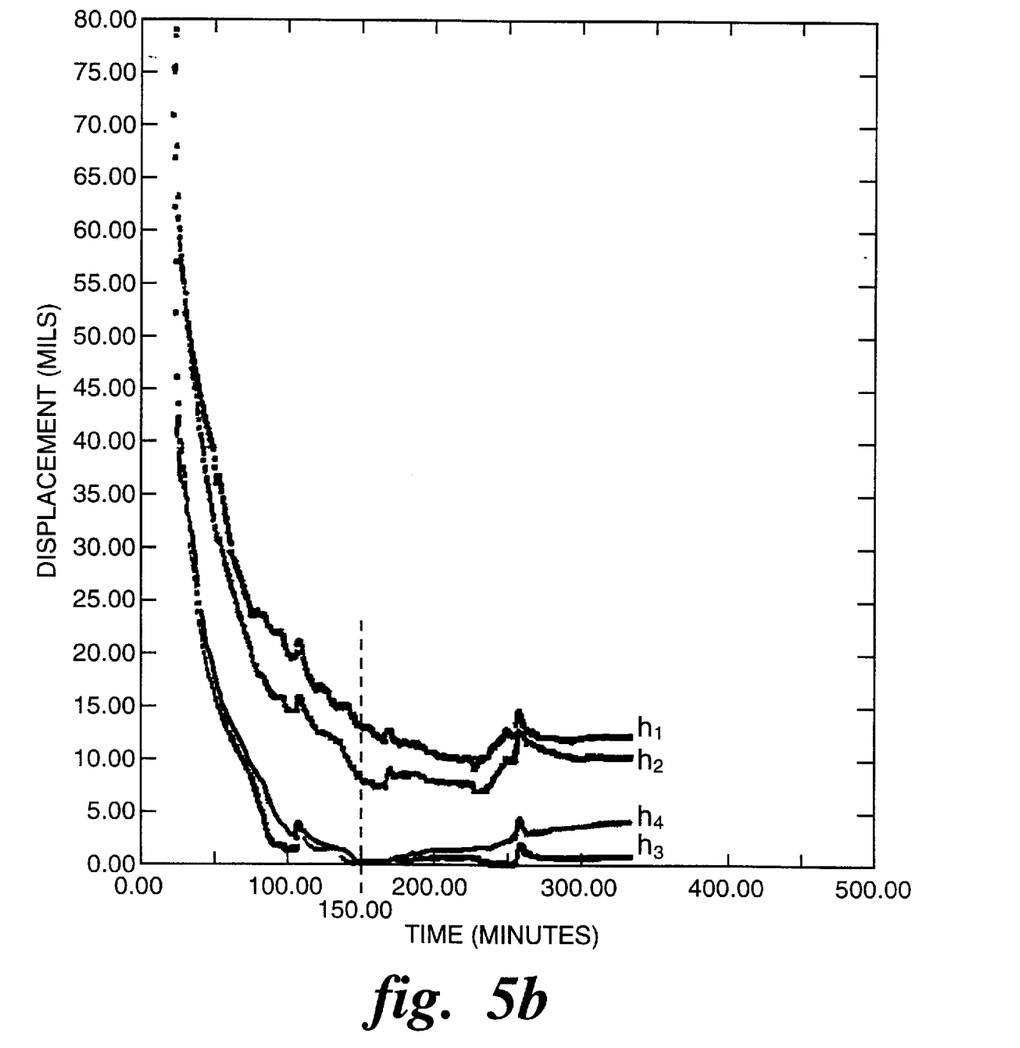

Besides wrinkling, there are many other problems associated with the moving contact of the compression molding process. For example, the moving contact configuration causes unsymmetrical heat transfer with respect to the mid-plane of the blade. Thus, a localized high shear stress zone develops near the root section due to the sharp thickness change. In addition, since the direction of resin flow is along the length of the blade, the mold force requirement which is defined as:

$$F \propto \frac{V_p L^4}{H^3}, \tag{1}$$

wherein F=Mold Force;

$V_p$=Mold Closing Speed;
L=Flow Path Length;
H=Molded Thickness;
will significantly increase. This lengthwise flow direction also tends to move the insert plies into physical restrictions of the ply stack-up, causing a wrinkle 24 as shown in FIG. 4. Typically, a high shear stress occurs during the first 150 minutes as depicted by the viscosity-temperature curve in FIG. 5a and the Mold Gap-Molding Time curves in FIG. 5b, while the mold closing speed and the viscosity are high. Another problem is that a high mold force is required to ensure the elimination of porosity. However, the high mold force will create higher resin flow and shear stresses on the plies, and more likely to cause a wrinkle. If a low mold force is used, a longer compression time is required to close the upper and lower mold. However, a lengthen compression time will likely increase the porosity and viscosity. In some cases, the blade is cured before complete closing, causing porosity at the edges.

The present invention has eliminated the wrinkle and porosity problems of the compression molding process by addressing their causes. In particular, the present invention has overcome the problems of the compression molding process by providing a compression mold and preform that balances the shear stress on the plies of the preform during the compression molding process, hence eliminating ply movement and wrinkles. In addition, the new mold and preform reduce the length of the flow path of the resin, which reduces the mold force requirement of equation 1, shear stress and hence wrinkles. The result is an ideal flow pattern during the compression molding process.

Figure 6A:
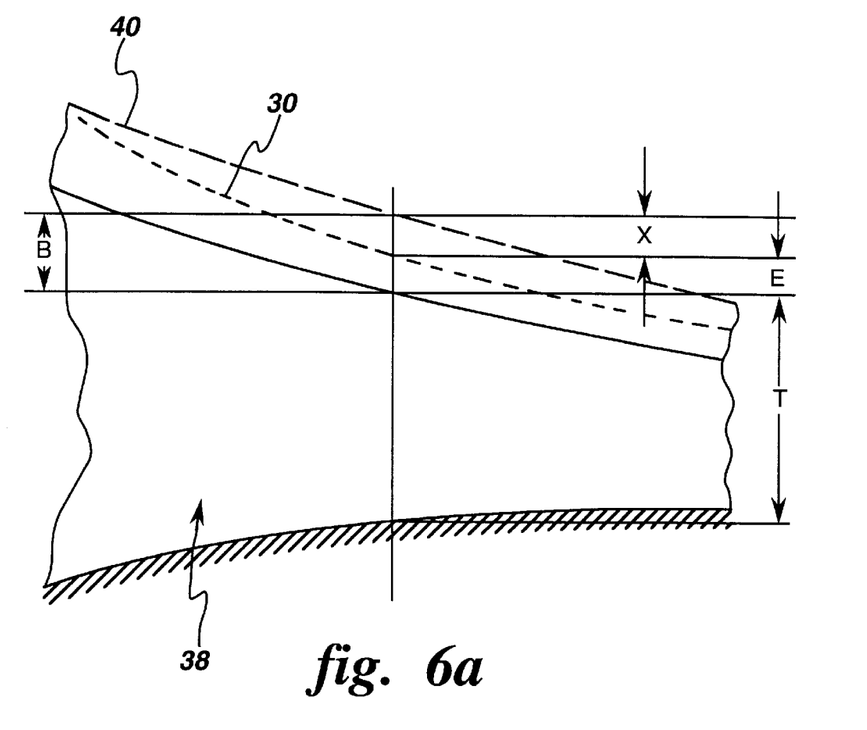
FIGS. 6a–6b are cross-sectional views of a preform used in the present invention.
Figure 6B:
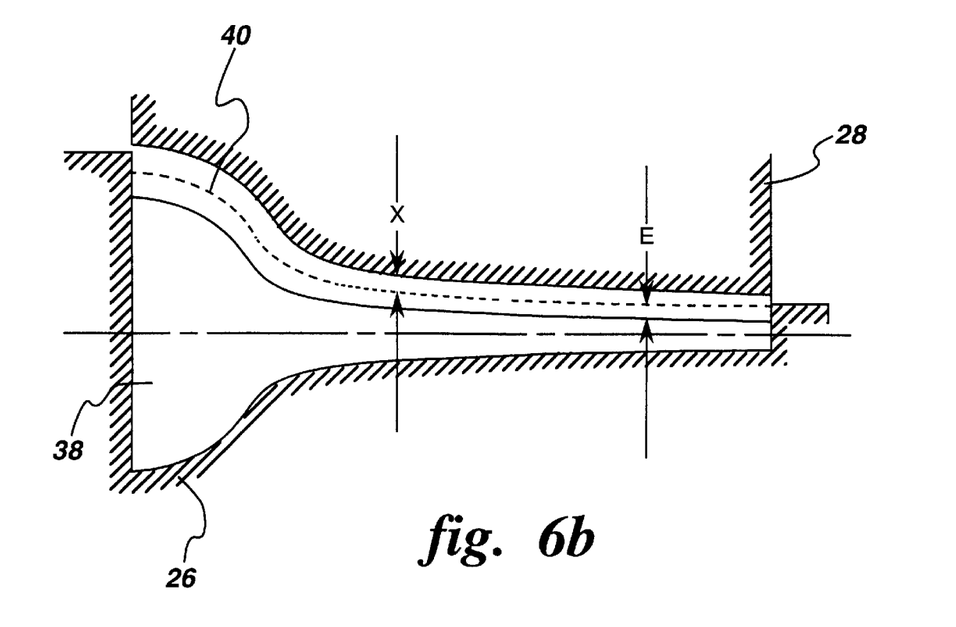

FIG. 6a shows a cross-sectional view of a preform 38 used in the present invention. In FIG. 6a the preform 38 has a final thickness T after the compression molding process and a bulk amount E prior to compression molding, which is equal to about 2% to 3% of T. Also, additional resin is added to each section of the preform 38 so that the total bulk is equal to a target of B at every section of the blade, wherein B is equal to E plus X, which is the extra thickness of required resin X. In the present invention, there are two methods that uniform bulk can be achieved by adding resin. One method is to add pure resin plies or resin plies with minimal fiber by evenly distributing them in the preform 38 symmetrical to the mid-plane of the blade. In the second method, multiple classes of prepreg with varying resin content are used for the ply lay-up, such that the resultant preform has more resin at the tip section 44 and less at the root section 42 to constitute a uniform amount of target bulk B. The difference between the additional thickness X of the preform 38 and the conventional preform is shown by the top of the surfaces 30 and 40 of the preforms, respectively, prior to compression. An overall view of the full contact preform 38 and its relationship with the lower mold 26 and the upper mold 28 is shown in FIG. 6b.

Figure 7A:
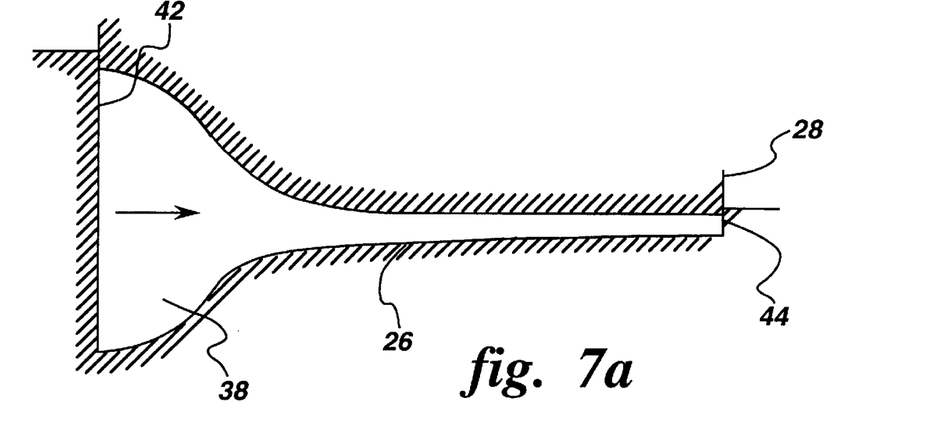
FIGS. 7a–7b are a cross sectional view and a top view, respectively, of the composite fan blade of the present invention during a compression molding process.
Figure 7B:
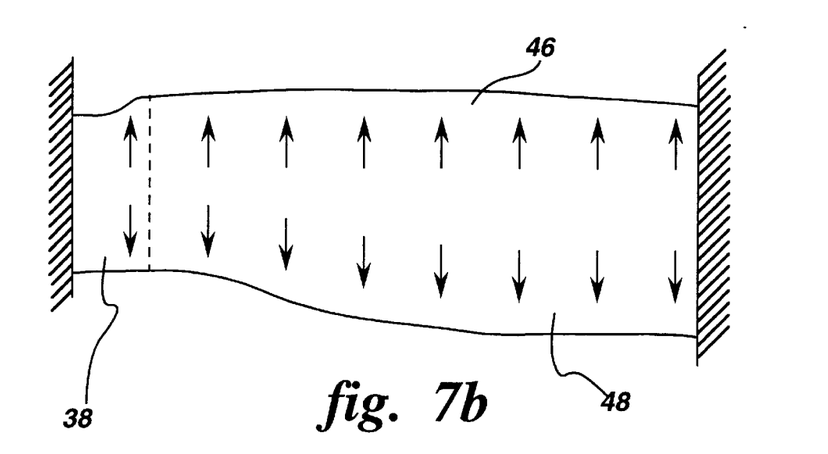

FIGS. 7a–7b show a cross sectional view and a top view, respectively, of the preform 38 during the compression molding process. In the compression molding process, the upper mold 28 moves down and compresses the top surface 40 of the preform 38 and the plies of resin impregnated layers to a final surface of the preform such that the root section 42 and the tip section 44 receive a balanced amount of resin flow, pressure, and shear stress. In the present invention, the root section 42 and the tip section 44 are closed with the molds, while the leading edge 46 and the trailing edge 48 are open. The extra resin will bleed through the edges, forming a flash which can be horizontal or vertical. The flash can be attained by using a semi-positive type mold that keeps the edges basically open throughout the process and pinched closed at the very last stage to a finite cavity volume to facilitate later removal of the flash. The uniform gap X between the preform 38 and the upper mold 28 of the semi-positive type mold work together to balance the resin flow, pressure, and shear stresses, as indicated by the arrows in FIG. 7b. Therefore, the pressure gradient will be balanced throughout the preform from the root section 42 to the tip section 44. Since the resin flow, pressure, and shear stresses are balanced throughout the blade (i.e., a shorter spanwise flow path), less mold force is required, so the plies of resin impregnated layers will not move and form a wrinkle.

Figure 8:
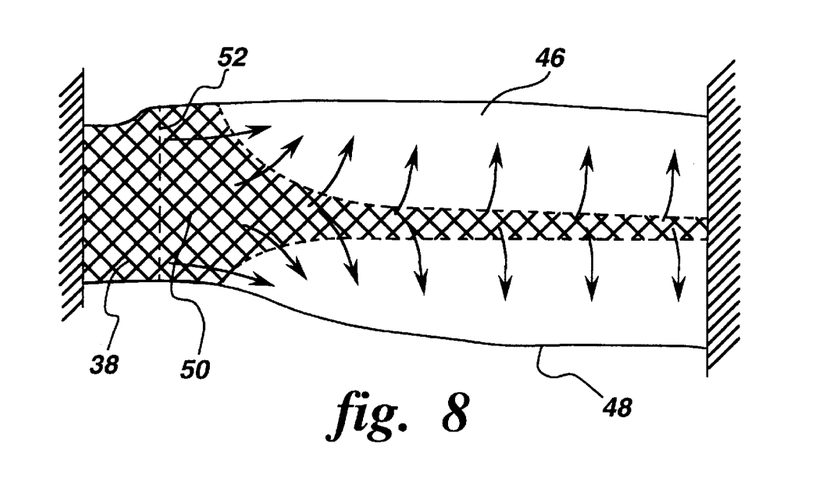
FIG. 8 is a top view of the composite fan blade during a compression molding process according to a second embodiment of the present invention.

FIG. 8 shows a top view of the composite fan blade during a compression molding process according to a second embodiment of the present invention. In the second embodiment, the upper and lower mold cause the resin to flow on the preform 38 about a symmetric line 50 between the root section and tip section. The extra resin is removed from the preform through the leading edge 46 and trailing edge 48. In the second embodiment, the preform 38 has a uniform bulk B that is implemented only for the maximum thickness region for the tip section such that it is at a distance far enough from the root to vane transition section 52. The resin flow, pressure, and shear stresses as indicated by the arrows is symmetric to the line 50 and the root to vane transition section 52, which further minimizes the extra resin as compared to the full contact preform in the first embodiment (see the crossed-hatched area in FIG. 8).

Figure 9:
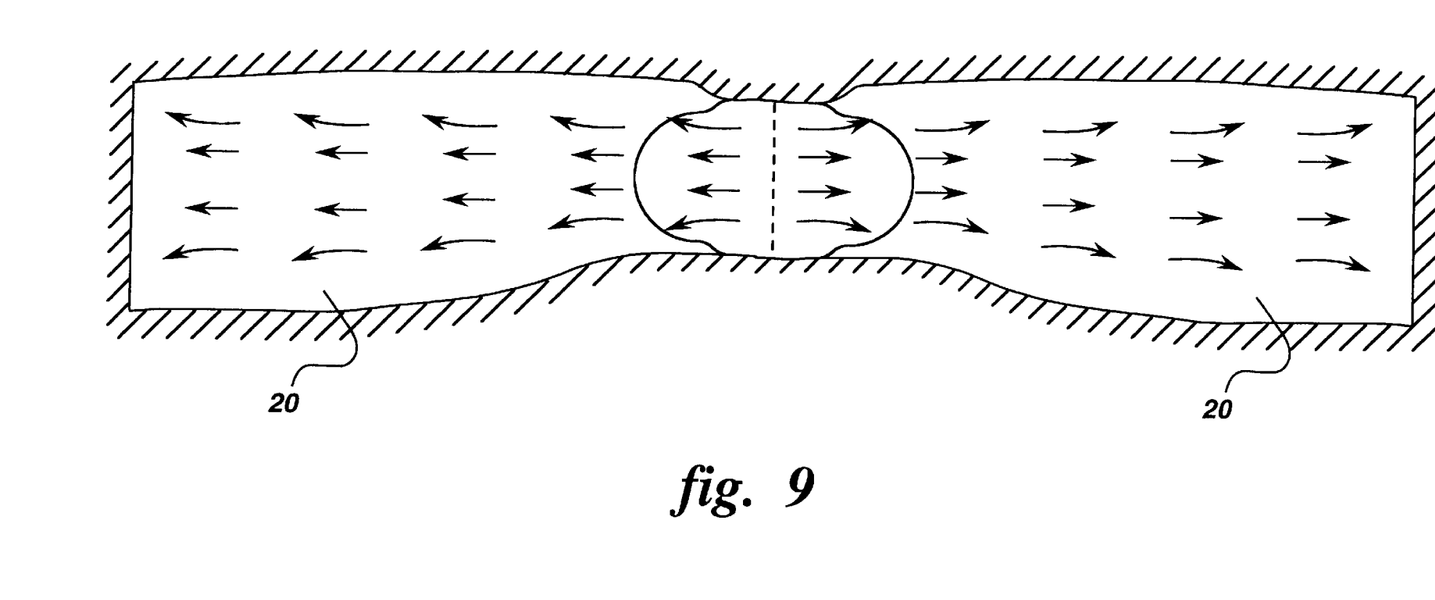
FIG. 9 is a top view of the composite fan blade during a compression molding process according to a third embodiment of the present invention.

FIG. 9 shows a top view of the composite fan blade during a compression molding process according to a third embodiment of the present invention. In the third embodiment, the preform is made up of two preforms 20 as shown in FIGS. 2–4, wherein one of the preforms is a 180 degrees planar rotation duplicate of the other such that the root sections are aligned and joined. The first and second preforms 20 are then inserted in the lower mold such that the ply lay-up is continuous through the joined root sections. The upper mold moves down towards the lower mold compressing the first and second preforms to form two cavities. In the third embodiment, the upper mold provides a moving contact to the first and second preforms. The resin from the preform flows in a symmetric line from the root sections to the tip sections of both the first and second preforms 20. Even if the existing moving contact is used, the flow and shear stress as indicated by the arrows are balanced. Thus, ply movement is eliminated, preventing wrinkles from occurring.

Figure 10:
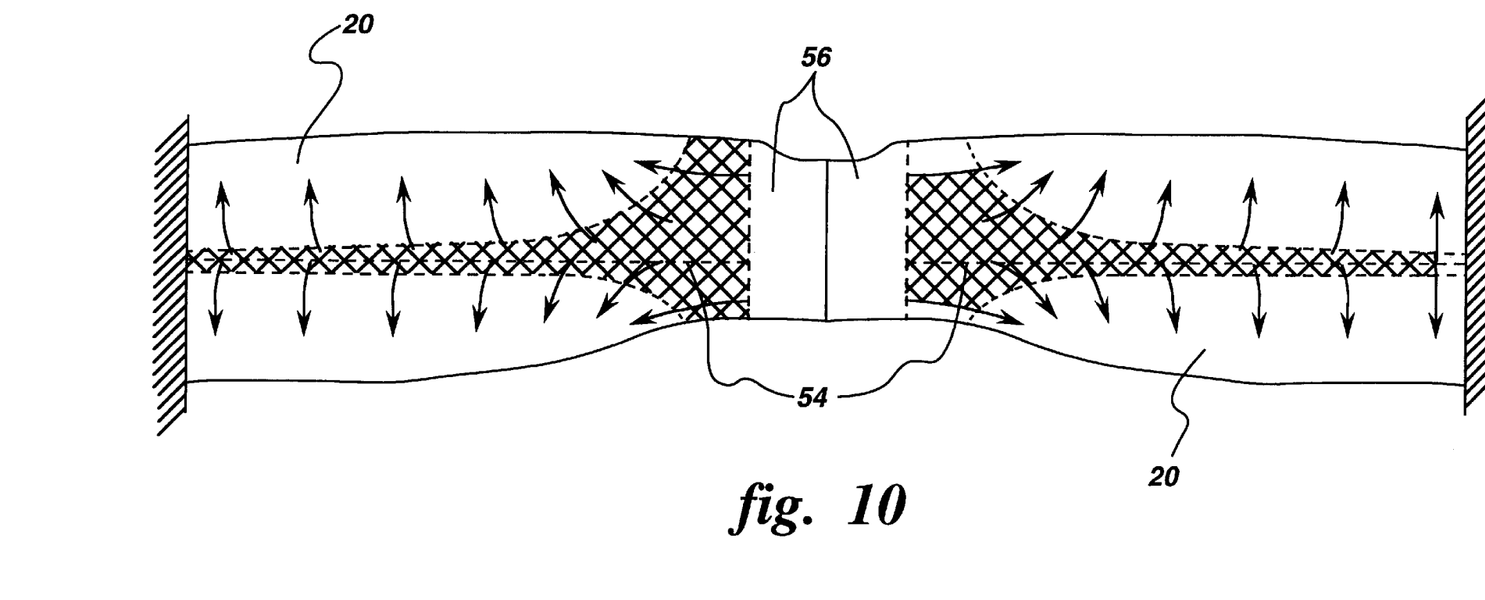
FIG. 10 is a top view of the composite fan blade during a compression molding process according to a fourth embodiment of the present invention.

FIG. 10 shows an alternative embodiment to the third embodiment disclosed in FIG. 9. In this embodiment, resin flows from the first and second preforms 20 about a symmetric line 54 between the root section and the tip section of both preforms. The upper and lower mold compress the first and second preforms with a full contact as opposed to a moving contact. Extra resin is removed from the preforms through the leading and trailing edges. The resin flow, pressure, and shear stresses as indicated by the arrows are symmetric to the line 54 and the root to vane transition section 56. Since the flow path and the mold force requirement are greatly reduced with this embodiment, ply movement is eliminated, preventing wrinkles from occurring.

The illustrative embodiment and other embodiments disclosed in the present invention has many advantages. For example, there is a full or improved contact between mold and blade during the compression molding process. The full or improved contact provides better heat transfer and control and also provides a better mold force distribution, which eliminates stress concentration. Another advantage, is the present invention provides a shorter flow path, which reduces the mold force requirement and shear stress, and hence wrinkles. A third advantage is the present invention balances the resin flow, pressure, and shear stress, eliminating ply movement. Another advantage is that porosity is eliminated by having extra resin flow through and better process modeling optimization and control. A fifth advantage of the present invention is that it can be used to simulate a full 3-D process. Currently, a full 3-D boundary value process model with a moving contact is not available and has been a major hurdle in numerical modeling for decades. Existing 2.5-D process models, (e.g., FEMAP-COMP) can be used validly for process optimization and control for the cases with full contact.

It is therefore apparent that there has been provided in accordance with the present invention, a method and a system for forming a composite airfoil structure that fully satisfy the aims and advantages and objectives hereinbefore set forth. The invention has been described with reference to several embodiments, however, it will be appreciated that variations and modifications can be effected by a person of ordinary skill in the art without departing from the scope of the invention.

We claim:

1. A method for forming a composite airfoil structure in a mold having a lower mold and an upper mold from a preform of resin impregnated prepreg plies, the composite airfoil structure having a root section at one end and a tip section at a second end opposite therefrom, extending from the root section to the tip section are a leading edge and a trailing edge, the method comprising the steps of:

inserting the preform in the lower mold;

moving the upper mold towards the lower mold;

compressing the preform with the upper and lower mold;

providing a full contact between the upper mold, the preform, and the lower mold, wherein the resin from the preform flows in a symmetric line between the root section and tip section of the preform, the full contact preventing wrinkling from developing by balancing resin flow through the root section and tip section of the preform, pressure, and shear stresses developing through the root section and tip section of the preform;

removing extra resin from the preform through the leading edge and the trailing edge; and forming the composite airfoil structure from the preform.

2. The method according to claim 1, wherein the preform has a bulk thickness E and a resin thickness X added to the bulk thickness E, the sum of the bulk thickness E and the resin thickness X is the constant bulk amount B required for full contact between the upper mold, the preform, and the lower mold and to provide a uniform gap between the upper mold and the leading edge of the preform.

3. The method according to claim 2, wherein the bulk thickness E is equal to from about 2% to 3% of a final thickness T of the composite airfoil structure.

4. The method according to claim 2, wherein the composite airfoil structure has a total bulk equal to the constant bulk amount B at every section of the structure.

5. A method according to claim 1, wherein the step of removing resin comprises closing the root section and the tip section of the preform with the upper mold while leaving the leading edge and trailing edge open.

6. A method according to claim 5, wherein the resin removed from the leading edge and trailing edge forms a flash.

7. A method for forming a composite airfoil structure in a mold having a lower mold and an upper mold from a first and second preform composite of resin impregnated prepreg plies each having a root section at one end and a tip section at a second end opposite therefrom, extending from the root section to the tip section in the first and second preforms are a leading edge and a trailing edge, the method comprising the steps of:

attaching the first and second preforms together, wherein the root section of the first and second preforms are aligned and joined together;

inserting the first and second preforms in the lower mold;

moving the upper mold towards the lower mold;

compressing the first and second preforms with the upper and the lower mold;

providing a full contact between the upper mold, the first and second preforms, and the lower mold, wherein the resin flows in a symmetric line from the root section to the tip section of both the first and second preforms, the full contact preventing wrinkling from developing by balancing resin flow through the root section to the tip section of both the first and second preforms, pressure, and shear stresses developing through the root section to the tip section of both the first and second preforms;

removing extra resin from the first and second preforms through the leading edges and the trailing edges; and forming the composite airfoil structure from the first and second preforms.

\* \* \* \* \*